A. J. CHABOT.
TIRE ARMOR.
APPLICATION FILED SEPT. 14, 1914.
1,181,841.                                    Patented May 2, 1916.
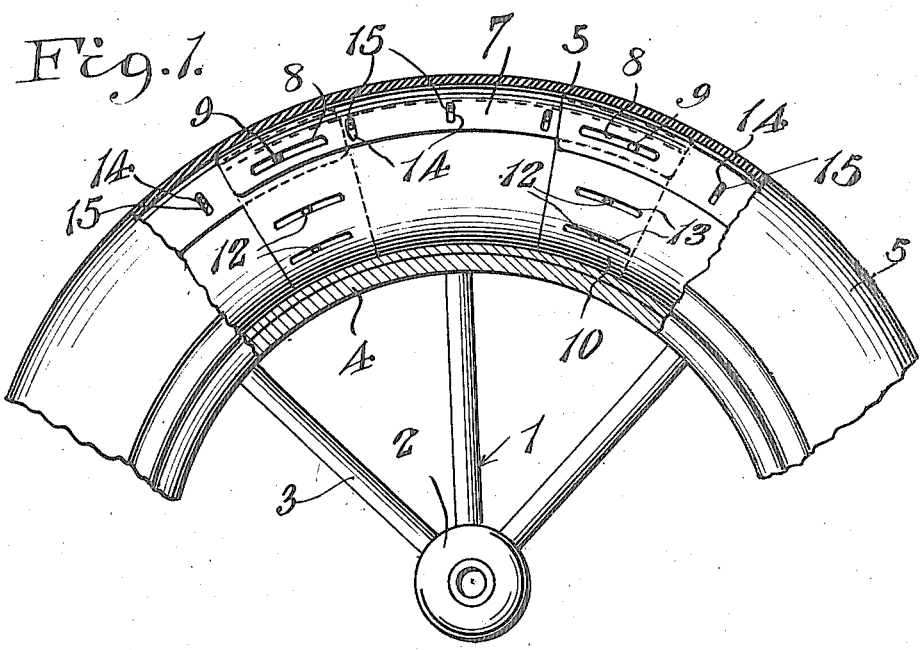
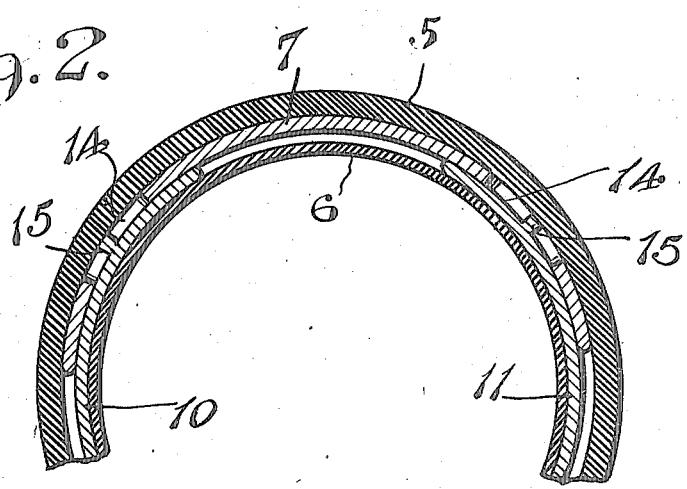

UNITED STATES PATENT OFFICE.

ALFRED J. CHABOT, OF MARLBORO, MASSACHUSETTS.

TIRE-ARMOR.

1,181,841.

Specification of Letters Patent.

Patented May 2, 1916.

Application filed September 14, 1914. Serial No. 861,619.

*To all whom it may concern:*

Be it known that I, ALFRED J. CHABOT, a citizen of the United States, residing at Marlboro, in the county of Middlesex and State of Massachusetts, have invented certain new and useful Improvements in Tire-Armor; and I do hereby declare the following to be a full, clear, and exact description of the invention, such as will enable others skilled in the art to which it appertains to make and use the same.

My invention relates to new and useful improvements in protecting devices for pneumatic tires, and has for its primary object to provide a simple and efficient and inexpensive armor that is to be positioned between the inner tube and outer casing of a pneumatic tire and will prevent punctures.

Another object is to provide tire armor of the character described which consists of a plurality of coacting sections that are secured to each other in a novel manner so that expansion thereof is permitted according to the expansion of the tire, and the resiliency of the tire is not interfered with.

The above and additional objects are accomplished by such means as are illustrated in the accompanying drawings, described in the following specification and then more particularly pointed out in the claim.

With reference to the drawings, wherein I have illustrated the preferred embodiment of my invention as it is reduced to practice, and throughout the several views of which similar reference numerals designate corresponding parts, Figure 1 is a fragmentary side elevation of a wheel showing a part of the wheel broken away and in section and my improved armor in position. Fig. 2 is a transverse sectional view taken through the tire showing the armor in place.

Referring to the drawings by characters of reference, 1 designates as an entirety a vehicle wheel consisting of a hub 2, spokes 3, and rim 4. Mounted on the rim 4 is a pneumatic tire of the ordinary construction comprising an outer casing 5 and inner tube 6.

My invention consists of a metallic armor comprising a plurality of segmental sheet metal plates 7, each is curved in cross section and is slidably connected with the adjacent section at its ends so as to form a continuous band to engage the curved part of the inner tube. These plates 7 each have provided at one end a pair of longitudinal slots 8. In the other end of each of these members 7 is a pair of lugs or like projections 9. The lugs 9 are slidably mounted within the slots 8, and thus it will be seen that the band formed by the plates 7 is allowed to expand and contract according to the condition of the tire. The plates 7 are formed relatively thin as are the projections 9 so as to prevent injury to the inner tube and outer casing. The plates 7 overlap each other as will be clearly seen upon reference to the drawings.

Coöperating with the plates 7 are pairs of segmental side plates 10 and 11 that are constructed similarly to the plates 7 and are overlapped by the plates 7 when in position. Each of these side plates is provided at one end with a pair of spaced longitudinal slots 12 similar to the ones 8, while each plate has at its other end a pair of lugs 13. The lugs 13 are extended to the slots 12 and operate in the same manner as the ones 9 in connection with the slots 8. To allow for the lateral as well as circumferential expansion I provide on opposite sides of the plates 7 longitudinal slots 14 that are designed to receive lugs 15 carried on the upper edges of the side plates 10 and 11. These slots 14 extend at right angles to the ones 8 and 12 and serve in combination with the lugs 15 to slidably connect the side plates with the top plates.

It will be readily seen that as the plates 7, 9, 10, and 11 form an armor which nearly incases the entire inner tube, punctures are prevented and the life of the tire is materially lengthened. The flexibility of the armor prevents its detracting from the resiliency of the tire.

In practice, I have found that the form of my invention illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:

A tire armor including a body formed of a plurality of metallic tread plates, each being of arcuate configuration and curved in cross section, and provided at one end with a pair of longitudinal slots, and at the other end with a pair of lugs, the slotted end of each tread plate being arranged in overlapping engagement with the end upon which the lugs are formed on the end of one of the adjacent plates and receiving the said lugs, each of the plates being further provided with transverse slots, side plates mounted on opposite sides of the tube and curved to conform to the shape of the tube, and each having one end provided with lugs, and the other end provided with slots, the slotted end of each side plate being opposed to the end which carries the lugs on one of the adjacent plates and having the slots receiving the same lugs, and lugs formed on the side plates, adjacent their outer edges and received by the transverse slots in the said plates.

In testimony whereof I affix my signature in presence of witnesses.

ALFRED J. CHABOT.

Witnesses:
R. H. BEAUDREAU,
EDWARD CHABOT,
GEORGE LEFOROME.